US012811208B2

(12) United States Patent
Carlson et al.

(10) Patent No.: US 12,811,208 B2
(45) Date of Patent: Nov. 24, 2026

(54) METHOD FOR SEPARATION, SEGREGATION, AND RECOVERY OF CONSTITUENT MATERIALS FROM ELECTROCHEMICAL CELLS

(71) Applicant: Solid Power Operating, Inc., Louisville, CO (US)

(72) Inventors: Benjamin Carlson, Minneapolis, MN (US); Joshua Buettner-Garrett, Arvada, CO (US)

(73) Assignee: Solid Power Operating, Inc., Louisville, CO (US)

( * ) Notice: Subject to any disclaimer, the term of this patent is extended or adjusted under 35 U.S.C. 154(b) by 988 days.

(21) Appl. No.: 17/647,298

(22) Filed: Jan. 6, 2022

(65) Prior Publication Data

US 2022/0384867 A1 Dec. 1, 2022

Related U.S. Application Data

(60) Provisional application No. 63/134,326, filed on Jan. 6, 2021.

(51) Int. Cl.

| | |
|---|---|
| ***H01M 10/54*** | (2006.01) |
| ***C22B 7/00*** | (2006.01) |
| ***C22B 21/00*** | (2006.01) |
| ***C22B 26/12*** | (2006.01) |

(52) U.S. Cl.

CPC ............. *H01M 10/54* (2013.01); *C22B 7/006* (2013.01); *C22B 21/0015* (2013.01); *C22B 21/0069* (2013.01); *C22B 26/12* (2013.01)

(58) Field of Classification Search

None

See application file for complete search history.

(56) References Cited

U.S. PATENT DOCUMENTS

| | | | | |
|---|---|---|---|---|
| 5,919,587 | A | 7/1999 | Mukherjee et al. | |
| 6,447,669 | B1* | 9/2002 | Lain | H01M 6/52 429/49 |
| 9,023,130 | B2 | 5/2015 | Kudo et al. | |
| 12,018,350 | B2 | 6/2024 | Hanisch et al. | |
| 2012/0091391 | A1 | 4/2012 | Tsuchida et al. | |
| 2012/0302779 | A1 | 11/2012 | Ueda | |
| 2013/0323142 | A1 | 12/2013 | Shimano et al. | |
| 2015/0093652 | A1* | 4/2015 | Aihara | H01M 10/0562 423/303 |
| 2018/0212282 | A1* | 7/2018 | Lee | C22B 7/001 |

(Continued)

FOREIGN PATENT DOCUMENTS

| | | |
|---|---|---|
| CN | 103563160 A | 2/2014 |
| CN | 108546822 A | 9/2018 |

(Continued)

OTHER PUBLICATIONS

Machine Translation—EP 3517641 A1 (Year: 2019).*

(Continued)

*Primary Examiner* — Ula C Ruddock

*Assistant Examiner* — Christina Renee Daulton

(74) *Attorney, Agent, or Firm* — Polsinelli PC; Blake Andrew Ronnebaum

(57) ABSTRACT

A method for separating and recovering materials from an electrochemical cell by dissolution in multiple solvents, separation of dissolved constituents, and recovery of materials.

13 Claims, 4 Drawing Sheets

(56) References Cited

U.S. PATENT DOCUMENTS

| | | | | |
|---|---|---|---|---|
| 2019/0198916 A1* | 6/2019 | Yoon | ..................... | H01M 4/366 |
| 2021/0032721 A1 | 2/2021 | Hanisch et al. | | |

FOREIGN PATENT DOCUMENTS

| | | | | | |
|---|---|---|---|---|---|
| CN | 108604705 | A | | 9/2018 | |
| CN | 108677014 | A | | 10/2018 | |
| CN | 109193062 | A | | 1/2019 | |
| CN | 110661051 | A | * | 1/2020 | ............ H01M 10/54 |
| CN | 111477990 | A | | 7/2020 | |
| CN | 111655875 | A | | 9/2020 | |
| DE | 69809469 | T2 | | 8/2003 | |
| EP | 3517641 | A1 | | 7/2019 | |
| JP | 2002-500424 | A1 | | 1/2002 | |
| JP | 2012-186150 | A1 | | 9/2012 | |
| JP | 2014-502309 | A1 | | 1/2014 | |
| JP | 5577926 | B2 | | 8/2014 | |
| KR | 102064668 | B1 | | 1/2020 | |
| WO | 1999-034473 | A1 | | 7/1999 | |
| WO | 2010-106618 | A1 | | 9/2010 | |
| WO | WO 2012-166104 | A1 | | 12/2012 | |
| WO | WO-2012164366 | A2 | * | 12/2012 | ........ H01M 10/0525 |

OTHER PUBLICATIONS

Machine Translation—WO_2012164366_A2 (Year: 2012).*

Machine Translation—CN110661051 A (Year: 2020).*

Liang, Chengdu et al. "Carbon/Sulfur Nanocomposites and Additives for High-Energy Lithium Sulfur Batteries." U.S. Department of Energy, May 2012, https://www.energy.gov/sites/prod/files/2014/03/f10/es105_liang_2012_p.pdf (Year: 2012).*

International Searching Authority, International Search Report and Written Opinion, issued for International Application No. PCT/US2022/011498, dated Apr. 20, 2022.

International Searching Authority, International Preliminary Report on Patentability, issued for International Application No. PCT/US2022/011498, dated Jul. 20, 2023 (11 pages).

Lin, Z. et al., Phosphorous Pentasulfide as a Novel Additive for High-Performance Lithium-Sulfur Batteries, Advanced Fuctional Materials, 23(8):, Jun. 14, 2012. DOI:10.1002/adfm.201200696.

* cited by examiner

METHOD FOR SEPARATION, SEGREGATION, AND RECOVERY OF CONSTITUENT MATERIALS FROM ELECTROCHEMICAL CELLS

CROSS-REFERENCE TO RELATED APPLICATION

This application claims the benefit of priority to U.S. Provisional Patent Application No. 63/134,326, filed on Jan. 6, 2021, the entirety of which is incorporated herein by reference.

FIELD

Various embodiments described herein relate to the field of primary and secondary electrochemical cells, electrodes and electrode materials, electrolyte, electrolyte compositions, and methods of making, using, and reprocessing the same.

BACKGROUND

The ever-increasing number and diversity of mobile devices, the evolution of hybrid/electric automobiles, and the development of Internet-of-Things devices are driving greater need for battery technologies with improved reliability, capacity (Ah), thermal characteristics, lifetime and recharge performance. Currently, lithium solid-state battery technologies offer potential increases in safety, packaging efficiency, and enable new high-energy chemistries. With the increase in the utilization of solid-state battery technology, processes for reclamation and recycling of constituent materials are increasing in importance.

With the increasing public demand for rechargeable batteries, the cost of the raw materials for the batteries, such as lithium, nickel, and cobalt, also continues to rise. A possible way to maintain costs is to recycle the materials contained within used batteries by implementing acidic or alkaline digestion of these batteries, as described in U.S. Pat. No. 9,023,130 and Japanese Patent No. JP5577926. This type of battery recycling only safely works for rechargeable batteries that contain liquid electrolyte because the liquid electrolyte can be separated from the solid components of the batteries, which provides access to the nickel- and cobalt-containing layers of the batteries.

However, in solid-state batteries, specifically those that contain sulfide solid-state electrolytes, the removal of the electrolyte material can be dangerous and more complicated. In solid-state batteries, the solid-state electrolyte material may exist in the form of a fine powder that is blended with the nickel and cobalt containing materials. If the sulfide solid electrolyte materials are not removed from the cathode layer before known, recycling techniques are attempted, the exposure of the sulfide solid electrolyte material to water or acids will generate a harmful $H_2S$ gas.

Adding further complexity, in solid-state batteries, the anode layer, electrolyte layer, and cathode layers are laminated together at high pressure, which restricts direct access to the nickel- and cobalt-containing cathode active material. Without direct access to the cathode layer, it is not safe to recycle sulfide solid-state batteries using the recycling techniques known today. Described herein is a novel and safe recycling technique for used batteries that is compatible with sulfide solid-state batteries, as it uses targeted solvents to gently disassemble the battery into its constituent components for recovery of materials.

SUMMARY

The present application is directed to a method for separating and recovering materials from an electrochemical cell comprising (a) adding a solvent to the electrochemical cell that is situated in a container; (b) providing energy to the electrochemical cell and the solvent in the container to promote dissolution of first materials of the electrochemical cell; (c) separating the solvent and dissolved first materials from remaining materials of the electrochemical cell; and (d) recovering the dissolved first materials, optionally wherein (a), (b), (c), and (d) are repeated with one or more same or different solvents or mixtures thereof.

In one embodiment, the materials include electrode metals, solid-state electrolytes, active materials, binders, conductive additives, and derivatives thereof.

In another embodiment, the materials include lithium metal, a sulfide-based solid-state electrolyte, cathode active materials, binders, carbon additives, aluminum metal, and derivatives thereof.

In another embodiment, the method further comprises washing the remaining materials of the electrochemical cell with additional solvent to remove residual materials.

In another embodiment, the method further comprises separating comprises density segregation.

In another embodiment, the method further comprises adding a complexing agent to the electrochemical cell and solvent in the container.

In another embodiment, the complexing agent is selected from $P_2S_5$, elemental sulfur, $P_4S_8$, $P_4S_9$, $Sb_2S_5$ and mixtures thereof.

In another embodiment, the dissolved materials comprise a $P_2S_5$—$Li_2S$ complex.

In another embodiment, the solvent comprises a hydrocarbon-based solvent.

In another embodiment, the solvent comprises a xylene-based solvent.

In another embodiment, steps (a), (b), (c), and (d) are repeated with a polar solvent.

In another embodiment, steps (a), (b), (c), and (d) are repeated with a nitrile-based solvent.

In another embodiment, the nitrile-based solvent comprises acetonitrile, propionitrile, butyronitrile, isobutyronitrile, or mixtures thereof.

In another embodiment, the providing of energy comprises physically agitating the electrochemical cell and the solvent in the container or applying heat to the electrochemical cell and the solvent in the container.

In another aspect, this disclosure describes a method of recycling an electrochemical cell containing lithium metal comprising (a) soaking the electrochemical cell in one or more solvents optionally applying agitation or heat, wherein binders and/or polymers constituents of the electrochemical cell are solubilized in the solvent; (b) removing the solvent with the solubilized binders and/or polymer constituents of the electrochemical cell; (c) adding a different solvent to the electrochemical cell and soaking the electrochemical cell, optionally applying agitation or heat, wherein additional binders and/or polymers constituents of the solid-state electrolyte are solubilized in the different solvent so as to free up the lithium metal of the electrochemical cell to form a mixture having lithium metal dispersion; (d) adding a complexing agent to the lithium metal dispersion to form a complex with the freed lithium metal to form a precipitate;

(e) filtering the precipitate to recover the lithium metal complex, optionally wherein (a), (b), (c), (d), and/or (e) are repeated with one or more same or different solvents or mixtures thereof.

In another embodiment of the method of recycling, the solvent of (a) comprises a hydrocarbon-based solvent.

In another embodiment of the method of recycling, the different solvent of (c) comprises a polar solvent or a nitrile-based solvent.

In another embodiment of the method of recycling, the complexing agent of (d) comprises elemental sulfur, $P_4S_3$, $P_4S_4$, $P_4S_5$, $P_4S_6$, $P_4S_7$, $P_4S_8$, $P_4S_9$, $P_4S_{10}$ ($P_2S_5$), $Sb_2S_3$, and $Sb_2S_5$ or mixtures thereof.

In another embodiment of the method of recycling, the hydrocarbon-based solvent comprises xylene, toluene, benzene, hexane, heptane, octane, isoparaffinic hydrocarbons, aprotic hydrocarbons, or mixtures thereof.

In another embodiment of the method of recycling, the different solvent comprises an ether, an ester, a nitrile, an alcohol, a thiol, a ketone, or mixtures thereof.

BRIEF DESCRIPTION OF DRAWINGS

The present disclosure may be understood by reference to the following detailed description taken in conjunction with the drawings briefly described below. It is noted that certain elements in the drawings may not be drawn to scale.

DETAILED DESCRIPTION OF ILLUSTRATED EMBODIMENTS

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes, devices, and systems finding application in the various embodiments described herein are not disclosed in detail.

Figure 1:
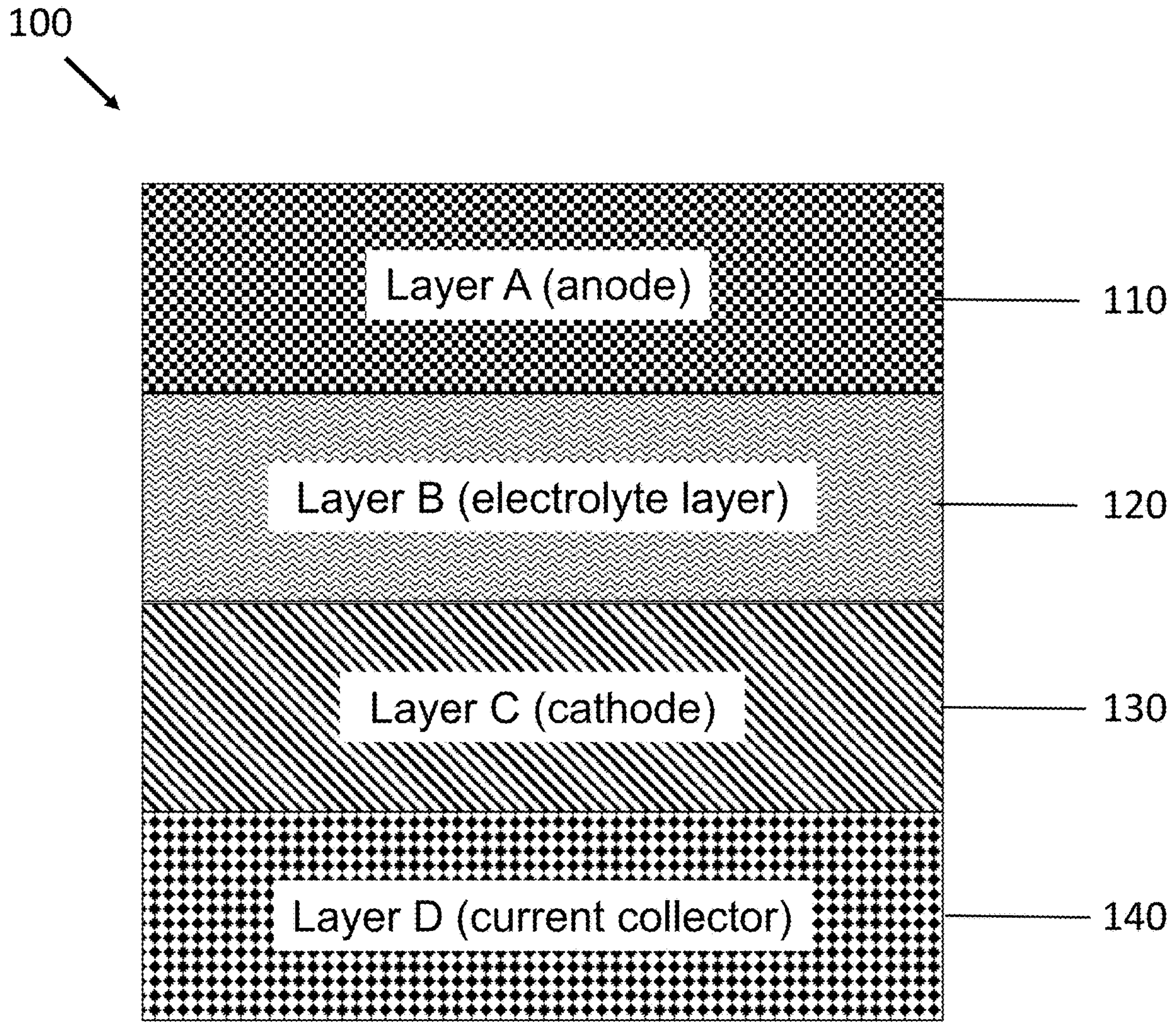
FIG. 1 is a simplified schematic diagram of the layer structure of an electrochemical cell including a solid-state electrolyte.

FIG. 1 is a simplified schematic diagram of the layer structure of an exemplary electrochemical cell 100 including a solid-state electrolyte. Cell 100 may include multiple layers including, but not limited to, an anode layer 110, an electrolyte layer 120, a cathode layer 130, and a current collector layer 140. The anode layer 110 may be formed from foils of lithium metal or lithium alloys where the lithium alloys may comprise one or more of Sodium metal (Na), or Potassium metal (K). In one embodiment, the lithium metal foil may comprise one or more of an alkaline earth metal such as Magnesium (Mg) and Calcium (Ca). In another embodiment, the lithium foil may comprise Aluminum (Al), Indium (In), Silver (Ag), Gold (Au), or Zinc (Zn).

In a further embodiment, lithium may be deposited on a metal foil which acts as a current collector much like current collector layer 140, which may comprise one or more of Copper (Cu), Aluminum (Al), Nickel (Ni), Titanium (Ti), Stainless Steel, Magnesium (Mg), Iron (Fe), Zinc (Zn), Indium (In), Germanium (Ge), Silver (Ag), Platinum (Pt), or Gold (Au). In one embodiment, the anode layer 110 may comprise one or more materials such as Silicon (Si), Tin (Sn), Germanium (Ge) graphite, $Li_4Ti_5O_{12}$ (LTO) or other known anode active materials. In some embodiments, the anode layer 110 may further comprise one or more conductive carbon materials such as carbon fiber, graphite, graphene, carbon black, conductive carbon, amorphous carbon, VGCF, and carbon nanotubes. In some embodiments, the anode layer 110 may further comprise one or more solid-state electrolytes such as $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$— $P_2S_5$—LiI—LiBr, $Li_2S$—$SiS_2$, $Li_2S$—$SiS_2$—LiI, $Li_2S$—$SiS_2$—LiBr, $Li_2S$—S—$SiS_2$—LiCl, $Li_2S$—S—$SiS_2$—$B_2S_3$—LiI, $Li_2S$—S—$SiS_2$—$P_2S_5$—LiI, $Li_2S$—$B_2S_3$, $Li_2S$ $P_2S_5$—$Z_mS_n$ (where m and n are positive numbers, and Z is Ge, Zn or Ga), $Li_2S$—$GeS_2$, $Li_2S$—S—$SiS_2$—$Li_3PO_4$, and $Li_2S$—S—$SiS_2$—$Li_xMO_y$ (where x and y are positive numbers, and M is P, Si, Ge, B, Al, Ga or In).

In another embodiment, the solid-state electrolyte may be one or more of a $Li_3PS_4$, $Li_4P_2S_6$, $Li_7P_3S_{11}$, $Li_{10}GeP_2Si_2$, $Li_{10}SnP_2Si_2$. In a further embodiment, the solid-state electrolyte may be one or more of a $Li_6PS_5Cl$, $Li_6PS_5Br$, $Li_6PS_5I$ or expressed by the formula $Li_{7-y}$ $PS_{6-y}X_y$ where "X" represents at least one halogen elements and or pseudo-halogen and where $0<y\leq 2.0$ and where a halogen may be one or more of F, Cl, Br, I, and a pseudo-halogen may be one or N, NH, $NH_2$, NO, $NO_2$, $BF_4$, $BH_4$, $AlH_4$, CN, and SCN. In yet another embodiment, the solid-state electrolyte be expressed by the formula $Li_{8-y-z}P_2S_{9-y-z}X_yW_z$ (where "X" and "W" represents at least one halogen elements and or pseudo-halogen and where $0\leq y\leq 1$ and $0\leq z\leq 1$) and where a halogen may be one or more of F, Cl, Br, I, and a pseudo-halogen may be one or N, NH, $NH_2$, NO, $NO_2$, $BF_4$, $BH_4$, $AlH_4$, CN, and SCN. The anode layer 110 may further comprise one or more of a binder or polymers such as fluororesin containing vinylidene fluoride (VdF), hexafluoropropylene (HFP), tetrafluoroethylene (TFE), and derivatives thereof as structural units. Specific examples thereof include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the polymer or binder may be one or more of a thermoplastic elastomer such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, Poly (methacrylate) nitrile-butadiene rubber (PMMA-NBR) and the like. In a further embodiment, the polymer or binder may be one or more of an acrylic resin such as but not limited to polymethyl(meth)acrylate, polyethyl(meth)acrylate, polyisopropyl(meth)acrylate polyisobutyl(meth)acrylate, polybutyl(meth)acrylate, and the like. In yet another embodiment, the polymer or binder may be one or more of a polycondensation polymer such as but not limited to polyurea, polyamide paper, polyimide, polyester, and the like. In yet a further embodiment, the polymer or binder may be one or more of a nitrile rubber may be used such as but not limited to acrylonitrile-butadiene rubber (ABR), polystyrene nitrile-butadiene rubber (PS—NBR), and mixtures thereof.

The electrolyte layer 120 may include one or more sulfur-based solid-state electrolytes comprising one or more material combinations such as $Li_2S$—$P_2S_5$, $Li_2S$—$P_2S$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$— $P_2S_5$—LiI—LiBr, $Li_2S$—$SiS_2$, $Li_2S$—$SiS_2$—LiI, $Li_2S$—$SiS_2$—LiBr, $Li_2S$—S—$SiS_2$—LiCl, $Li_2S$—S—$SiS_2$—$B_2S_3$—LiI, $Li_2S$—S—$SiS_2$—$P_2S_5$—LiI, $Li_2S$—$B_2S_3$, $Li_2S$ $P_2S_5$—$Z_mS_n$ (where m and n are positive numbers, and Z is Ge, Zn or Ga), $Li_2S$—$GeS_2$, $Li_2S$—S—$SiS_2$—$Li_3PO_4$, and $Li_2S$—S—$SiS_2$-$Li_xMO_y$ (where x and y are positive numbers, and M is P, Si, Ge, B, Al, Ga or In). In some embodiments, one or more of the solid electrolyte materials may be $Li_3PS_4$, $Li_4P_2S_6$, $Li_7P_3S_{11}$, $Li_{10}GeP_2Si_2$, $Li_{10}SnP_2Si_2$. In an embodiment, one or more of the solid electrolyte materials may be $Li_6PS_5Cl$, $Li_6PS_5Br$, $Li_6PS_5I$ or expressed by the formula $Li_{7-y}PS_{6-y}X_y$ where "X" represents at least one halogen elements and or pseudo-halogen and where $0<y\leq 2.0$ and where a halogen may be one or more of F, Cl, Br, I, and a pseudo-halogen may be one or N, NH, $NH_2$, NO, $NO_2$, $BF_4$, $BH_4$, $AlH_4$, CN, and SCN. In another embodiment, one or more of the solid electrolyte materials may be expressed by the formula $Li_{8-y-z}P_2S_{9-y-z}X_yW_z$ (where "X" and "W" represents at least one halogen elements and or pseudo-halogen and where $0\leq y\leq 1$ and $0\leq z\leq 1$) and where a halogen may be one or more of F, Cl, Br, I, and a pseudo-halogen may be one or N, NH, $NH_2$, NO, $NO_2$, $BF_4$, $BH_4$, $AlH_4$, CN, and SCN. The electrolyte layer 120 may further comprise materials such as binders and polymers which can be one or more of but not limited to fluororesin containing vinylidene fluoride (VdF), hexafluoropropylene (HFP), tetrafluoroethylene (TFE), and derivatives thereof as structural units. Specific examples thereof may include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the polymer or binder may be one or more of a thermoplastic elastomer, such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, Poly (methacrylate) nitrile-butadiene rubber (PMMA-NBR) and the like. In a further embodiment, the polymer or binder may be one or more of an acrylic resin such as but not limited to polymethyl(meth)acrylate, polyethyl(meth)acrylate, polyisopropyl(meth)acrylate polyisobutyl(meth)acrylate, polybutyl(meth)acrylate, and the like. In yet another embodiment, the polymer or binder may be one or more of a polycondensation polymer such as but not limited to polyurea, polyamide paper, polyimide, polyester, and the like. In yet a further embodiment, the polymer or binder may be one or more of a nitrile rubber may be used such as but not limited to acrylonitrile-butadiene rubber (ABR), polystyrene nitrile-butadiene rubber (PS—NBR), and mixtures thereof.

The cathode layer 130 may include a cathode active material such as ("NMC") nickel-manganese-cobalt which can be expressed as $Li(Ni_aCo_bMn_c)O_2$ ($0<a<1$, $0<b<1$, $0<c<1$, $a+b+c=1$) or, for example, NMC 111 ($LiNi_{0.33}Mn_{0.33}Co_{0.33}O_2$), NMC 433 ($LiNi_{0.4}Mn_{0.3}Co_{0.3}O_2$), NMC 532 ($LiNi_{0.5}Mn_{0.3}Co_{0.2}O_2$), NMC 622 ($LiNi_{0.6}Mn_{0.2}Co_{0.2}O_2$), NMC 811 ($LiNi_{0.8}Mn_{0.1}Co_{0.1}O_2$) or a combination thereof. In another embodiment, the cathode active material comprise one or more of a coated or uncoated metal oxide, such as but not limited to $V_2O_5$, $V_6O_{13}$, $MoO_3$, $LiCoO_2$, $LiNiO_2$, $LiMnO_2$, $LiMn_2O_4$, $LiNi_{1-Y}Co_YO_2$, $LiCo_{1-Y}Mn_YO_2$, $LiNi_{1-Y}Mn_YO_2$ ($0\leq Y<1$), $Li(Ni_aCo_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ ($0<Z<2$), $LiCoPO_4$, $LiFePO_4$, CuO, $Li(Ni_aCo_bAl_c)O_2$ ($0<a<1$, $0<b<1$, $0<c<1$, $a+b+c=1$) or a combination thereof. In yet another embodiment, the cathode active material may comprise one or more of a coated or uncoated metal sulfide such as but not limited to titanium sulfide ($TiS_2$), molybdenum sulfide ($MoS_2$), iron sulfide (FeS, $FeS_2$), copper sulfide (CuS), and nickel sulfide ($Ni_3S_2$) or combination thereof. The cathode layer 130 may further comprise one or more conductive carbon materials such as carbon fiber, graphite, graphene, carbon black, conductive carbon, amorphous carbon, VGCF, and carbon nanotubes. The cathode layer 130 may further comprise one or more solid-state electrolyte wherein the solid electrolyte comprises one or more material combinations such as $Li_2S$—$P_2S_5$, $Li_2S$—$P_2S_5$—LiI, $Li_2S$—$P_2S_5$—$GeS_2$, $Li_2S$—$P_2S$—$Li_2O$, $Li_2S$—$P_2S_5$—$Li_2O$—LiI, $Li_2S$— $P_2S_5$—LiI—LiBr, $Li_2S$—$SiS_2$, $Li_2S$—$SiS_2$—LiI, $Li_2S$—$SiS_2$—LiBr, $Li_2S$—S—$SiS_2$—LiCl, $Li_2S$—S—$SiS_2$—$B_2S_3$—LiI, $Li_2S$—S—$SiS_2$—$P_2S_5$—LiI, $Li_2S$—$B_2S_3$, $Li_2S$—$P_2S_5$—$Z_mS_n$ (where m and n are positive numbers, and Z is Ge, Zn or Ga), $Li_2S$—$GeS_2$, $Li_2S$—S—$SiS_2$—$Li_3PO_4$, and $Li_2S$—S—$SiS_2$-$Li_xMO_y$ (where x and y are positive numbers, and M is P, Si, Ge, B, Al, Ga or In). In another embodiment, the solid-state electrolyte may be one or more of a $Li_3PS_4$, $Li_4P_2S_6$, $Li_7P_3S_{11}$, $Li_{10}GeP_2Si_2$, $Li_{10}SnP_2Si_2$. In a further embodiment, the solid-state electrolyte may be one or more of a $Li_6PS_5Cl$, $Li_6PS_5Br$, $Li_6PS_5I$ or expressed by the formula $Li_{7-y}PS_{6-y}X_y$ where "X" represents at least one halogen elements and or pseudo-halogen and where $0\leq y\leq 2.0$ and where a halogen may be one or more of F, Cl, Br, I, and a pseudo-halogen may be one or N, NH, $NH_2$, NO, $NO_2$, $BF_4$, $BH_4$, $AlH_4$, CN, and SCN. In yet another embodiment, the solid-state electrolyte be expressed by the formula $Li_{8-y-z}P_2S_{9-y-z}X_yW_z$ (where "X" and "W" represents at least one halogen elements and or pseudo-halogen and where $0\leq y\leq 1$ and $0\leq z\leq 1$) and where a halogen may be one or more of F, Cl, Br, I, and a pseudo-halogen may be one or N, NH, $NH_2$, NO, $NO_2$, $BF_4$, $BH_4$, $AlH_4$, CN, and SCN. The cathode layer 130 may further comprise one or more of a binder or polymer such as fluororesin containing vinylidene fluoride (VdF), hexafluoropropylene (HFP), tetrafluoroethylene (TFE), and derivatives thereof as structural units. Specific examples thereof include homopolymers such as polyvinylidene fluoride (PVdF), polyhexafluoropropylene (PHFP), and polytetrafluoroethylene (PTFE), and binary copolymers such as copolymers of VdF and HFP such as poly (vinylene difluoride-hexafluoropropylene) copolymer (PVdF-HFP), and the like. In another embodiment, the polymer or binder may be one or more of a thermoplastic elastomer such as but not limited to styrene-butadiene rubber (SBR), styrene-butadiene-styrene copolymer (SBS), styrene-isoprene block copolymer (SIS), styrene-ethylene-butylene-styrene (SEBS), polyacrylonitrile (PAN), nitrile-butylene rubber (NBR), polybutadiene, polyisoprene, Poly (methacrylate) nitrile-butadiene rubber (PMMA-NBR) and the like. In a further embodiment, the polymer or binder may be one or more of an acrylic resin such as but not limited to polymethyl (meth) acrylate, polyethyl (meth) acrylate, polyisopropyl (meth) acrylate polyisobutyl (meth) acrylate, polybutyl (meth) acrylate, and the like. In yet another embodiment, the polymer or binder may be one or more of a polycondensation polymer such as but not limited to polyurea, polyamide paper, polyimide, polyester, and the like. In yet a further embodiment, the polymer or binder may be one or more of a nitrile rubber may be used such as but not limited to acrylonitrile-butadiene rubber (ABR), polystyrene nitrile-butadiene rubber (PS-NBR), and mixtures thereof.

Current collector layer 140 may comprise one or more of Aluminum (Al), Nickel (Ni), Titanium (Ti), Stainless Steel, Magnesium (Mg), Iron (Fe), Zinc (Zn), Indium (In), Germanium (Ge), Silver (Ag), Platinum (Pt), Gold (Au).

Figure 2:
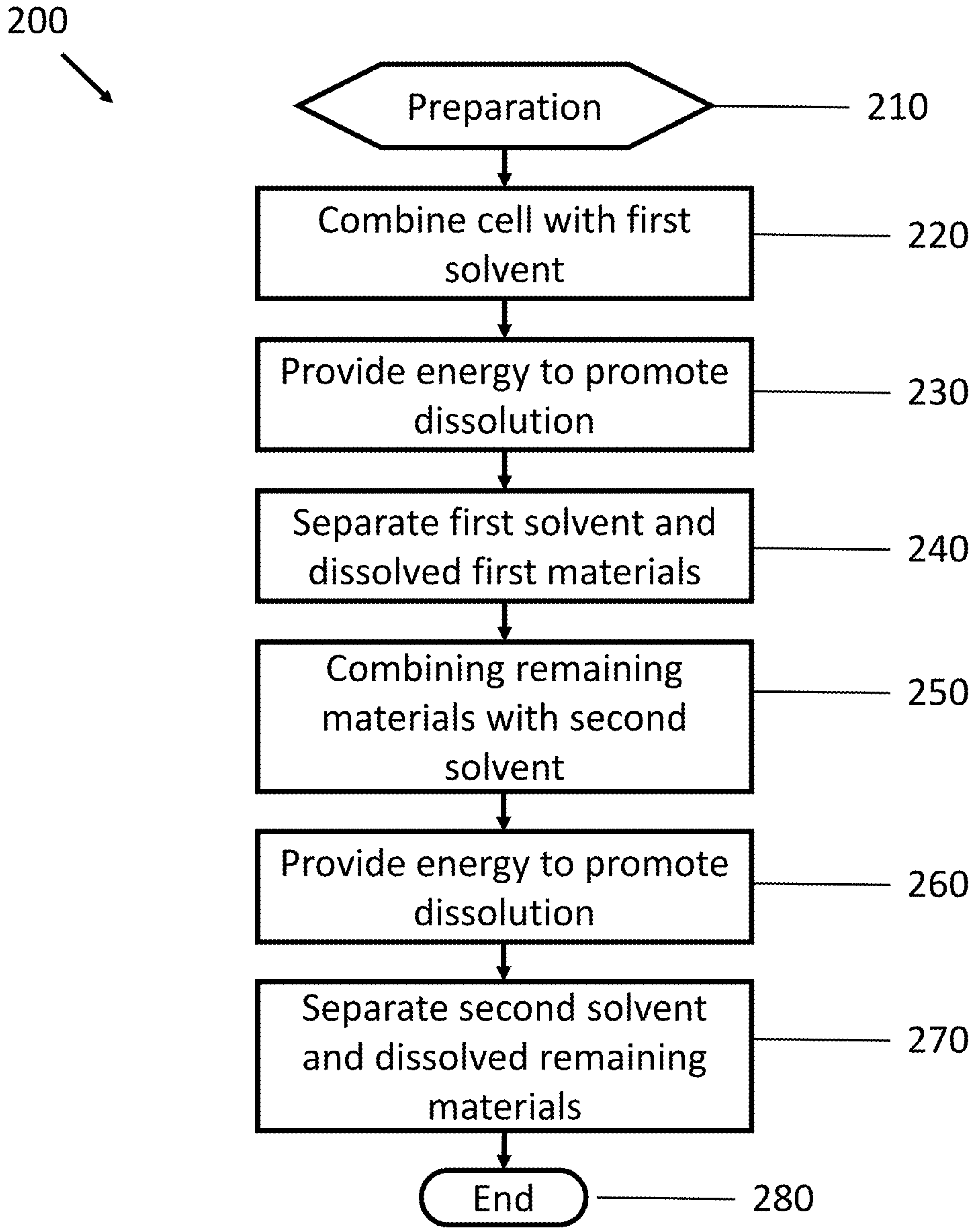
FIG. 2 is a flow chart of a process for dissolving, separating, segregating, and reclaiming constituent materials of an electrochemical cell including a solid-state electrolyte.

FIG. 2 is a flow chart of a process for dissolving, separating, segregating, and reclaiming constituent materials of an electrochemical cell including a solid-state electrolyte. Process 200 begins with preparation step 210 wherein the preparation action includes discharging or de-energizing a cell, washing or rinsing the surface of a containment apparatus, e.g., a pouch, of a cell, or disassembly or removal of a containment apparatus of a cell. Also, any equipment preparation may take place. Process 200 may be preferably performed under inert conditions such as a dry Nitrogen or Argon atmosphere to minimize external chemical interactions. Furthermore, when certain materials and solvents are utilized, high-moisture conditions and elevated oxygen levels may affect or hinder process 200.

After any initial preparation, process 200 advances to step 220 where an electrochemical cell such as cell 100 of FIG. 1 is combined with a first solvent. The first solvent may be one or more hydrocarbon-based solvents, for example, xylene, toluene, benzene, hexane, heptane, octane, isoparaffinic hydrocarbons, aprotic hydrocarbons, or blends of any of the aforenamed. The first solvent should be selected such that binders and polymers contained within the layers of the electrochemical cell are soluble within said first solvent.

The temperature of the cell and first solvent may be in the range of −120 C to 450 C or, more generally, the temperature is in the range of a temperature that is above the freezing point of the solvents used to a temperature that is above the boiling temperature of the solvents used. When temperatures above the solvent's boiling point are used, the system where the process is occurring may be sealed and pressurized. To limit deterioration of various constituents of the cell being processed, the cell may be placed as a whole into the solvent. Alternatively, the cell may be at least partially disassembled or fragmented to facilitate processing. In another embodiment, cells that are sealed into pouches or other containers may be opened or removed prior to combining with the first solvent. The volume ratio of first solvent to cell is not critical but should be sufficient to support the desired dissolution. Generally, the first solvent is selected to dissolve the binders and polymers within the cell, such as within the anode layer 110, the electrolyte layer 120, and the cathode layer 130. The dissolution of these binders and polymers may permit the laminated layers of the cell to separate and for the individual particles comprised within each layer to disperse.

During step 230 energy is be applied to the solvent and cell to promote dissolution. Energy may be applied thermally by the addition of heat or radiation, or mechanically by stirring, tumbling, grinding, mixing or otherwise agitating. Following suitable dissolution, during step 240 dissolved materials and the solvent may be separated from remaining solid materials. Dissolved polymers and binders may be removed in solution with the solvent through various mean including one or more of but not limited to filtering, centrifuging, or decanting. Solid materials remaining after separation of dissolved components may be further washed with fresh solvent to further remove dissolved products such as the polymers and binders. The solvent used for washing may also be removed by one or more of filtering, centrifuging, or decanting.

In another embodiment, a solvent that may dissolve the binders and polymers used but is also inert to the other components of the electrochemical cell can be used. Using such a solvent allows for the polymers and binders to be dissolved and be separated from the different layers without adversely reacting with the other materials of the cell. Solvents having these properties may be one or more of a toluene, xylenes, benzene, heptane, or octane. In contrast, using primarily one or more solvents that may dissolve the binders but are reactive to other components of the electrochemical cell may result in irreversible degradation of valuable materials contained within the electrochemical cell. Solvents such as acetone or water may dissolve the binders and polymers but can react with the lithium metal anode and the solid electrolyte material producing unwanted or harmful side products such as hydrogen or $H_2S$ gas.

The use of the first solvent to dissolve the binders and polymers permit the layers within the cell to break apart gently without the need for mechanical force as in shredding, cutting, or grinding of the cells. This avoids adverse interactions between lithium metal and metal shredding or grinding components and avoids disintegration of the soft lithium metal. Additionally, the avoidance of one or more shredding or grinding processes protects the structural integrity of the NMC particles and other components for which the existing particle size is appropriate for reclamation and which may be reduced under additional mechanical stress complicating reuse.

In step 250, the remaining solid materials are combined with a second solvent. In some embodiments, the second solvent may be one or more of an ether such as tetrahydrofuran ("THF"), diethyl ether, dibutyl ether, and dioxane. In another embodiment, the second solvent may be one or more of an ester such as methyl acetate, ethyl acetate, propyl acetate, and amyl acetate. In yet another embodiment, the second solvent may be one or more of a nitrile such as acetonitrile, propionitrile, butyronitrile, isobutyronitrile, pyridine and pyrrolidine. In a further embodiment, the second solvent may be one or more of an alcohol such as methanol, ethanol, propanol, isopropyl alcohol, or tert-butyl alcohol. In another embodiment, the second solvent may be one or more of a thiol or ketone, and may include other polar solvents.

The temperature of the materials and second solvent may be in the range of −120 C to 450 C or more generally above the freezing point of the solvents used to above the boiling temperature of the solvents used. When temperatures above the solvent's boiling point are used, the system where the process is occurring may be sealed and pressurized. The ratio of solvent volume to material volume is not critical but should be sufficient to support the desired dissolution. During step 260 energy may be applied to the solvent and materials to promote dissolution. Energy may be applied thermally by the addition of heat or radiation, or mechanically by stirring, mixing or otherwise agitating.

The combination of the second solvent, such as THF with the remaining solid materials promotes dissolution and particle size reduction of the electrolyte materials commonly contained within one or more layers of the cell such as electrolyte layer 120 and cathode layer 130 both of FIG. 1. For example, THF enhances separation of the lithium metal layer 110 and the solid-state electrolyte layer 120 which may be strongly laminated together. Furthermore, the THF may also form a THF-Li complex at the surface of the lithium metal, protecting it from the ambient environment (e.g., air and moisture exposure) which may generate large amounts of heat or even burst into flames igniting the solvent in which the lithium metal is within.

One or more of an additional compound, such as elemental sulfur, $P_4S_3$, $P_4S_4$, $P_4S_5$, $P_4S_6$, $P_4S_7$, $P_4S_8$, $P_4S_9$, $P_4S_{10}$ ($P_2S_5$), $Sb_2S_3$, and $Sb_2S_5$ may be added to the solution as complexing agents to provide additional useful reactions. The complexing agents may be added in the amount of 0.1% to 200% the total weight of the solid electrolyte material contained in the electrochemical cell. In some embodiments, the complexing agents may be 10% to 150% the total weight of the solid electrolyte material contained in the electrochemical cell. In another embodiment, the complexing agents may be 40% to 130% the total weight of the solid electrolyte material contained in the electrochemical cell. In a further embodiment, the complexing agents may be 50% to 120% the total weight of the solid electrolyte material contained in the electrochemical cell. For example, the $P_2S_5$ while in THF may react with the remaining solid-state electrolyte material and aids dissolution via the following reaction:

$$2Li_6PS_5Br+THF \rightarrow Li_3PS_{4(s)}+2LiBr_{(sol)}+3Li_2S_{(s)}+0.5(P_2S_5—Li_2S)_{(sol)} \quad \text{Reaction 1}$$

Via this reaction, the electrolyte material is at least partially decomposed forming a soluble ($P_2S_5$—$Li_2S$) complex in THF where the ($P_2S_5$—$Li_2S$) complex may be one or more of a $Li_2P_2S_6$ or $LiPS_3$ compound. Additionally, LiBr, commonly used in solid-state electrolytes, is soluble in THF and will dissolve into the solution of ($P_2S_5$—$Li_2S$) in THF.

Residual solids that remain in the solution may include $Li_3PS_4$ or similar materials and $Li_2S$. Additional $P_2S_5$ supports further decomposition and dissolution of these remaining solids via the following reactions:

$$2Li_3PS_4+2P_2S_5 \rightarrow 3(P_2S_5—Li_2S)_{(sol)} \quad \text{Reaction 2}$$

$$Li_2S+P_2S_5 \rightarrow (P_2S_5—Li_2S)_{(sol)} \quad \text{Reaction 3}$$

With the addition of sufficient $P_2S_5$ to the THF-based solution in combination with an electrolyte material such as $Li_6PS_5Br$, the solid electrolyte materials may be converted into one or more materials that are fully soluble, such as:

$$2Li_6PS_5Br+4P_2S_5 \rightarrow 5(P_2S_5—Li_2S)_{(sol)}+2LiBr_{(sol)} \quad \text{Reaction 4}$$

Specifically, in Reaction 2, $P_2S_5$ is added in the amount of 123% the total weight of the solid electrolyte material $Li_3PS_4$. In Reaction 4, $P_2S_5$ is added in the amount of 142% the total weight of the solid electrolyte material $Li_6PS_5Br$. Once all the electrolyte material is dissolved into the reactive solvent, the ($P_2S_5$—$Li_2S$) complexes may separate into two or more portions of differing densities, which aids segregation of the different components of the cell based on density. The highest density layer (settling toward the bottom of the solution) may contain metal components of the current collector layer (e.g., current collector layer 140 of FIG. 1) and active material of the cathode layer 130 such as NMC particles. In some embodiments, the highest density layer may also contain anode active material form anode layer 110 where the anode active material may be one or more of but not limited to a silicon contain material, graphite containing material, or Tin containing material and the highest density ($P_2S_5$—$Li_2S$) complexes. An intermediate density layer (settling above the previously mentioned) may contain components such as carbon additives (carbon, graphite, ("VGCF") vapor grown carbon fiber) and the less dense ($P_2S_5$—$Li_2S$) complexes. The lowest density layer (floating near the top of the solution) may be low density materials such as the lithium metal.

Following suitable dissolution, during step 270, dissolved materials and the solvent may be separated from remaining solid materials with the aid of filtering or centrifugation. Solid materials remaining after separation may be further washed with fresh solvent to further remove dissolved products. The lowest density components such as the lithium metal may be skimmed off of the top of the solution and collected for reprocessing. The intermediate density ($P_2S_5$—$Li_2S$) complexes containing the carbon additives may be isolated subsequently. The carbon additives may be filtered out of the isolated portion of the solution, washed, stored, and reused. Next, the highest density ($P_2S_5$—$Li_2S$) complexes which may contain the NMC, and current collector materials may be passed through a filter small enough to remove the current collector materials but large enough to allow the NMC materials to pass. The resulting NMC material containing mixture may be filtered again to isolate the NMC material which may be subsequently washed, stored, and reprocessed.

The lithium that is collected may be, for example, reused or reprocessed into lithium foil or converted into lithium precursors such as $Li_2S$ or $Li_3N$; Process 200 terminates with step 280.

In an alternative process where the order of actions of the first and second solvents are reversed, the xylene or other suitable first solvent may be applied last to dissolve the polymer and/or binder materials. After suitable removal of the lithium foil and dissolution of the solid-state electrolyte, the remaining materials include carbon additives, NMC, current collector, and binders. The addition of xylene at this time dissolves the binder and permits separation of the components. In a further alternative, the binder may remain in the final NMC/carbon composite and an acid can be used to dissolve the NMC. In this further alternative process, the NMC may be filtered from the binder and the carbon. Subsequently, the binder-carbon mixture may be heated in an inert environment where the binder may be carbonized.

In other cell structures where the anode material is not lithium but instead, for example, silicon or graphite, a solvent such as propanol may be used to dissolve the electrolyte material instead of using THF. Dissolving the solid-state electrolyte in propanol may not produce as strongly a result in separation by differences in density as much as THF. This results in increased difficulty of separating the carbon additives from the NMC and anode active material. To overcome this challenge, a high-density solvent may be added so that carbon additives would float and the denser NMC and other metal components would sink to the bottom of the solution.

Alternative process steps may be utilized to alter the presence of the ($P_2S_5$—$Li_2S$) complexes in THF used to separate out the materials by differences in densities. The ($P_2S_5$—$Li_2S$) complexes in THF may be removed from the process and a high-density solvent, such as fluorinated hydrocarbons (e.g., hexafluorobenzene and perfluorodecalin) could be added to separate out the carbon additives from the NMC. Additionally, elemental sulfur may be used in conjunction with the $P_2S_5$ or in replacement of the $P_2S_5$ to aid in the dissolution and removal of the solid-state electrolyte or to adjust the densities of the ($P_2S_5$—$Li_2S$) complexes in THF. $Li_2S$ and elemental sulfur in THF forms lithium polysulfides ($Li_2S_x$ where $1<X\leq 8$). The addition of the sulfur may also initiate decomposition of the solid-state electrolyte much like $P_2S_5$ or lithium polysulfides may form additionally density regions within the solution. Further adjustment of the $P_2S_5$ may be done to fully dissolve the solid-state electrolyte into the solution.

Figure 3A:
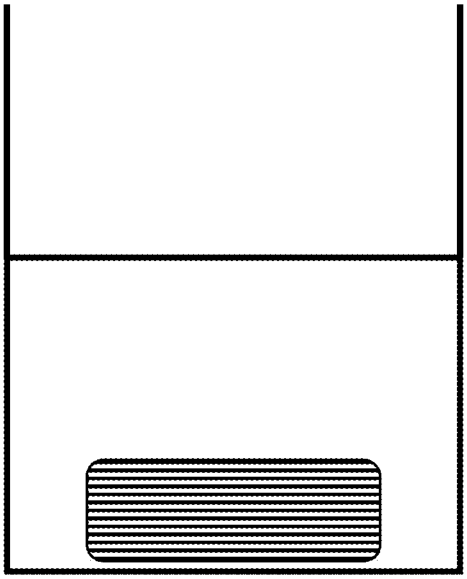
FIGS. 3A-3D are a set of pictorial schematics illustrating various steps of the process of FIG. 2.
Figure 3B:
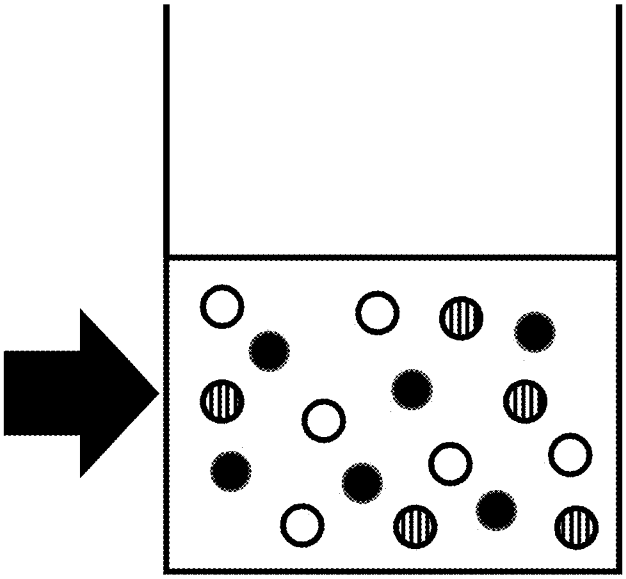
Figure 3C:
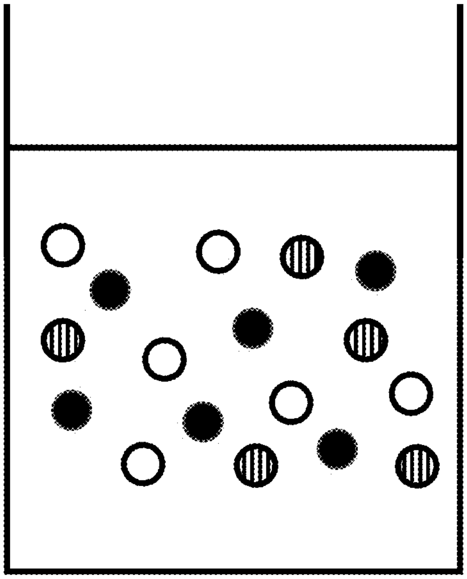
Figure 3D:
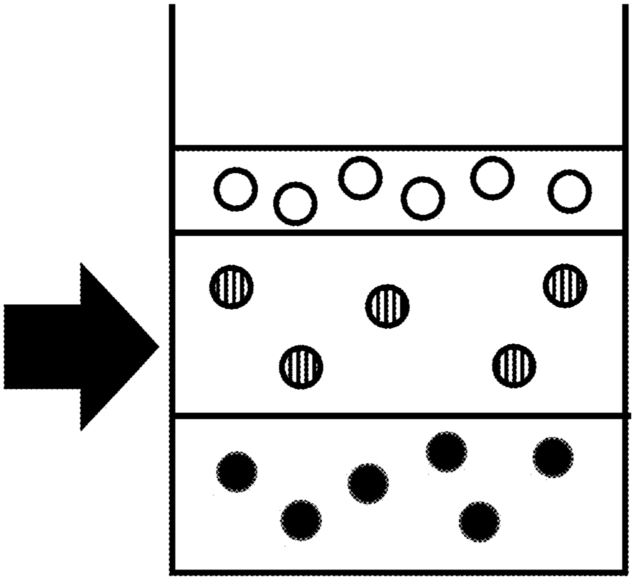

FIGS. 3A-3D are a set of pictorial schematics illustrating various steps of the process of FIG. 2. FIG. 3A illustrates process step 220 where a monolithic cell is combined with a first solvent and FIG. 3B illustrates process step 230 where various constituents of the cell are broken down to form a heterogeneous solution of liquid and solid components such as fully dissolved binders, and solid particles of solid-state electrolyte, cathode active material, and carbon additives. FIG. 3C illustrates the combining of various solid components remaining after the process steps associated with FIG. 3B with the second solvent. FIG. 3D illustrates the separation and density segregation of further dissolved constituents of the original cell. In this example, although three density divisions are indicated, it should be understood that greater or fewer divisions may result depending on the original structure and composition of the cell processed. The divisions in FIG. 3D may, for example, correlate to an electrochemical cell with a lithium metal anode, a sulfide-based solid-state electrolyte, an NMC-based cathode, and an aluminum current collector is processed according to process 200. The least dense layer indicated by segregated open circles may be associated with lithium metal from an anode such as that of FIG. 1. The intermediately dense layer indicated by partially filled circles may be associated with ($P_2S_5$—$Li_2S$) complexes and various carbon additives resulting from the action of the reactive solvent upon the solid-state electrolyte from materials from a layer such as layer 120 of FIG. 1. The densest layer indicated by filled circles may be associated with ($P_2S_5$—$Li_2S$) complexes, NMC materials, and metals resulting from the action of the reactive solvent upon the solid-state electrolyte from materials from layers such as layer 130 and layer 140 of FIG. 1.

Examples

Construction of the Cathode Layer

The cathode layer was constructed using an NMC cathode active material, a $Li_2S$—$P_2S_5$ containing solid-state electrolyte, a carbon-based conductive additive, and a polymer. These components were mixed in a solvent capable of dissolving the polymer, forming a cathode composite which was then placed on an aluminum foil current collector. The cathode composite layer was the dried and compressed to form a compact cathode layer.

Construction of the Solid-State Electrolyte Layer

The solid-state electrolyte layer was constructed by mixing a $Li_2S$—$P_2S_5$ containing solid-state electrolyte and a polymer in a solvent capable of dissolving the polymer. This mixture was the coated into a backer material and the solvent was removed. The layer was compressed to form a compact solid-state electrolyte layer.

Construction of an Electrochemical Cell

An electrochemical cell containing an anode layer made of a lithium metal foil, a solid-state electrolyte layer and a cathode layer was constructed by removing the backer from the solid-state electrolyte layer and placing one side of the solid-state electrolyte layer onto the surface of the cathode layer opposite the current collector layer. A layer of lithium metal foil was then place on the solid-state electrolyte layer opposite the cathode layer. The layered stack was then laminated to ensure uniform contact between all the layers.

Deconstruction of the Electrochemical Cell

The electrochemical cell was then cut into stripes measuring 0.25 inches wide. These stripes were then placed in a 32 oz glass jar.

Removal of the Polymer 16 oz of xylenes was added to the glass jar containing the strips of the electrochemical cell. The glass jar containing the strips of the electrochemical cell was then shaken by hand for 2 minutes. Within the 2 minutes, the polymer having solubility in xylenes, dissolved, and the layers within the strips began to separate. As the polymer continued to dissolve, the individual particles contained within the cathode layer and solid electrolyte layer dispersed throughout the xylenes. The xylenes containing the polymer was then removed by filtering through a metal mesh where the pores of the mesh were small enough to catch the smallest of the newly freed particles. The solids were then placed back into the 32 oz jar and 16 oz of xylenes was added once again. The jar was the shaken for 1 minute to ensure all the binder was dissolved. The xylenes containing the polymer was once again filtered through a metal mesh where the pores of the mesh were small enough to catch the smallest of the newly freed particles.

Removal of the Lithium Metal Anode Active Material

Figure 4:
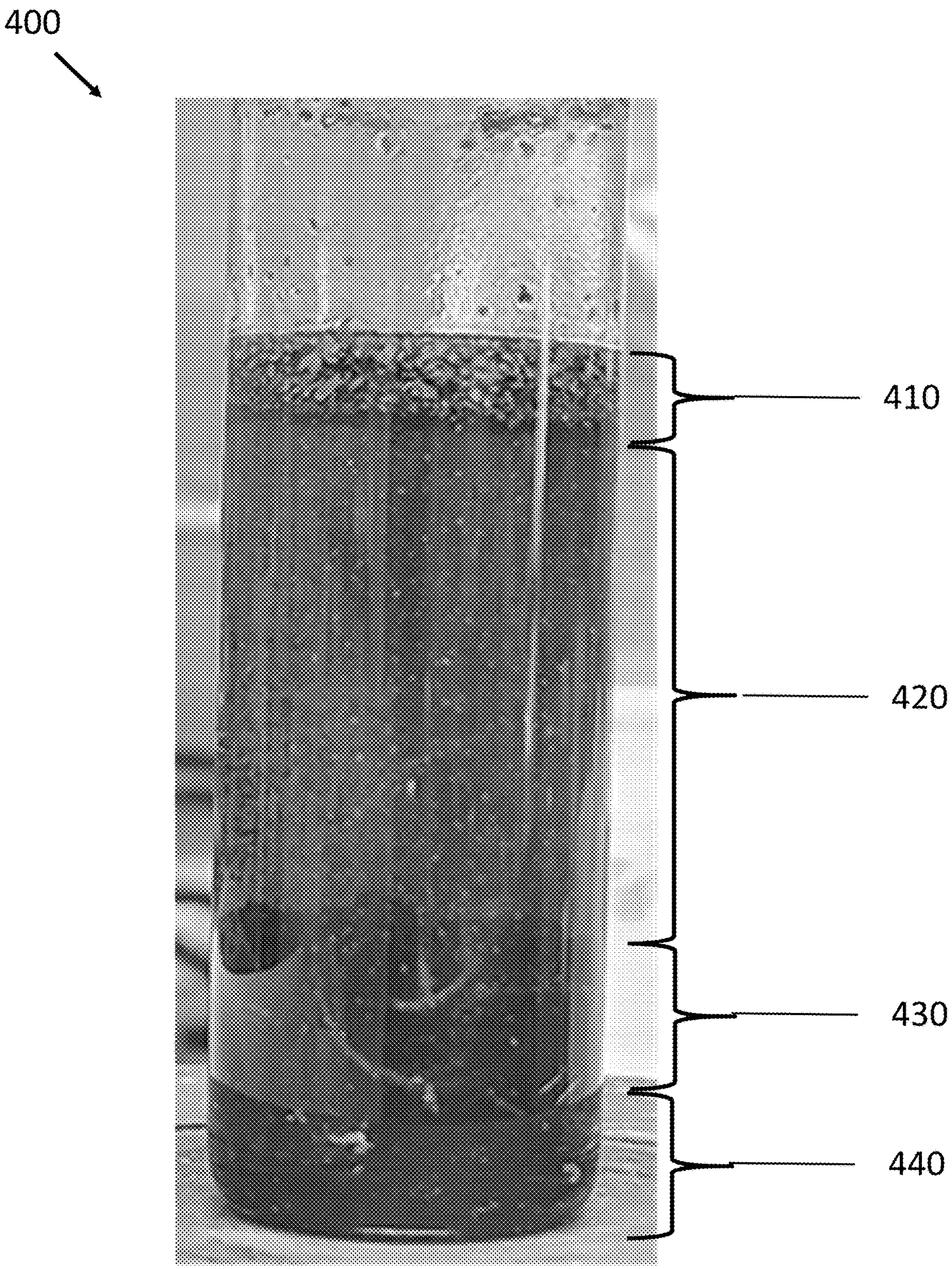
FIG. 4 is a photograph showing one example of the materials derived from use of the method where the electrochemical cell had been disassembled, the binder removed, a ether base solvent was added, and $P_2S_5$ was added.

The contents of the 32 oz jar were then transferred to a 50 ml glass vial. 25 mls of tetrahydrofuran (THF) was added to the 50 ml vial containing the remaining materials. The 50 ml vial containing this mixture was shaken by hand for 2 minutes. During the time, the solid-state electrolyte contained in the cathode layer and solid-state electrolyte layer starts to breakdown and dissolve into the THF forming a ($Li_2S$—$P_2S_5$) complex. Through this dissolution process, the interface between the solid-state electrolyte layer and the lithium foil layer breaks down freeing the two layers form each other. The mixture was then allowed to settle allowing the lithium metal, having the lowest density of all the materials, to float to the top. $P_2S_5$ in the amount equal to 125% the weight of the total amount of solid electrolyte material used within the electrochemical cell, was added to the THF mixture within the 50 ml vial. The vial containing all the material was then shaken by hand for 30 minutes. During this time, the $P_2S_5$ further breaks down the solid-state electrolyte forming more of a ($Li_2S$—$P_2S_5$) complex in the THF. After the 30 minutes, the mixture was allowed to settle and the remaining lithium metal was allowed to float to the top of the THF mixture as shown in FIG. 4. The 50 ml vial containing all the remaining materials 400 shows multiple layers of differing densities forming. At the top there is the lowest density layer 410 containing the lithium metal. Below that is the first intermediate layer 420 containing the lowest density ($Li_2S$—$P_2S_5$) complex and the lowest density particles of the carbon additive material. Next is the second intermediate layer 430 containing higher density ($Li_2S$—$P_2S_5$) complexes and bulk of the conductive additive. At the very bottom, is the highest density layer 440 containing the NMC cathode active material, the aluminum current collector, and the heaviest of the ($Li_2S$—$P_2S_5$) complexes. Once all the lithium rose to the top, it was removed by passing portions of the lowest density layer containing the lithium metal through a metal mesh large enough to collect the lithium but small enough to have other smaller particulates pass through the mesh with ease. The lithium pieces were then washed with THF to remove the residual ($Li_2S$—$P_2S_5$) complexes

Removal of the Conductive Additive

The first intermediate density layer 420 containing the lightest conductive additive particles and the second intermediate layer 430 containing the rest of the conductive additives was decanted from the 50 ml glass vial by use of a pipet. The decanted layers were then passed through a filter with a pore size small enough to capture the conductive additive particles. The filtered ($Li_2S—P_2S_5$) complexes in THF were added back to the added back to the 50 ml vial and the conductive additive was washed with 20 mls of THF to remove any ($Li_2S—P_2S_5$) complexes residue.

Removal of the Current Collector Layer

The remaining contents of the vial were passed through a course metal mesh to remove the strips of current collector layer. The strips of the current collector layer were washed with THF and the material that passed through the metal mesh filter was placed back into the 50 ml vial.

Removal of the Cathode Active Material

The remaining contents of the vial were passed through a fine mesh filter where the pore size was small enough to capture the NMC cathode active material. After filtering the NMC cathode active material out of the THF solution, the NMC cathode active material was washed with 20 mls of THF to remove any ($Li_2S—P_2S_5$) complex residue. The THF solution was placed back into the 50 ml vial where the only remaining contents was the ($Li_2S—P_2S_5$) complex in THF.

Summary of Results

As shown by the contents of the 50 ml glass vial 400 in FIG. 4, it is possible to separate the multitude of components contained within a laminated electrochemical cell by using specific solvents, such as xylenes, to remove the binders or polymers contained within the individual layers. This is then followed by the use of specific solvents such as THF to break down portions of the solid-state electrolyte contained in the cathode layer, solid-state electrolyte layer and in some applications, the anode layer. Once the binders, polymers, and solid electrolyte materials are fully or partially removed from individual layers of the electrochemical cell, the remaining materials break down into their respective powders or foils. When complexing agents such as elemental sulfur or $P_2S_5$ are added to the mixture of electrochemical cell components and THF, the complexing agents may further break down the solid-state electrolyte and form a multitude of liquid layers separated by densities which may be tuned to separate the variety of materials contained with an electrochemical cell. Once separated, the layers can easily be removed by decanting and filtering.

Features described above as well as those claimed below may be combined in various ways without departing from the scope hereof. It should thus be noted that the matter contained in the above description or shown in the accompanying drawings should be interpreted as illustrative and not in a limiting sense. The above-described embodiments should be considered as examples of the present invention, rather than as limiting the scope of the invention. In addition to the foregoing embodiments of inventions, review of the detailed description and accompanying drawings will show that there are other embodiments of such inventions. Accordingly, many combinations, permutations, variations and modifications of the foregoing embodiments of inventions not set forth explicitly herein will nevertheless fall within the scope of such inventions. The following claims are intended to cover generic and specific features described herein, as well as all statements of the scope of the present method and system, which, as a matter of language, might be said to fall there between.

We claim:

1. A method for separating and recovering materials from a solid-state electrochemical cell comprising:

(a) adding a solvent and a complexing agent to the solid-state electrochemical cell that is situated in a container, wherein the materials of the solid-state electrochemical cell include a sulfide-based solid-state electrolyte, wherein the complexing agent is selected from the group consisting of $P_2S_5$, $P_4S_8$, $P_4S_9$, $Sb_2S_5$ and mixtures thereof, wherein adding the complexing agent decomposes the sulfide-based solid electrolyte;

(b) providing energy to the solid-state electrochemical cell and the solvent in the container to promote dissolution of first materials of the solid-state electrochemical cell;

(c) separating the solvent and dissolved first materials from remaining materials of the solid-state electrochemical cell;

(d) recovering the dissolved first materials; and (e) repeating steps (a), (b), (c), and (d) with one or more same or different solvents or mixtures thereof.

2. The method of claim 1 wherein the materials further include electrode metals, active materials, binders, or conductive additives.

3. The method of claim 1 wherein the materials include lithium metal, cathode active materials, binders, carbon additives, or aluminum metal.

4. The method of claim 1 further comprising washing the remaining materials of the solid-state electrochemical cell with additional solvent to remove residual materials.

5. The method of claim 1 wherein separating comprises density segregation.

6. The method of claim 1 wherein one of the dissolved materials comprises a $P_2S_5—Li_2S$ complex.

7. The method of claim 1 wherein the solvent comprises a hydrocarbon-based solvent.

8. The method of claim 1 wherein the solvent comprises a xylene-based solvent.

9. The method of claim 1 wherein steps (a), (b), (c), and (d) are repeated with a polar solvent.

10. The method of claim 1 wherein steps (a), (b), (c), and (d) are repeated with a nitrile-based solvent.

11. The method of claim 10 wherein the nitrile-based solvent comprises acetonitrile, propionitrile, butyronitrile, isobutyronitrile, or mixtures thereof.

12. The method of claim 1 wherein the providing of energy comprises physically agitating the solid-state electrochemical cell and the solvent in the container or applying heat to the solid-state electrochemical cell and the solvent in the container.

13. A method for separating and recovering materials from a solid-state electrochemical cell comprising:

(a) adding a solvent and a complexing agent to the solid-state electrochemical cell that is situated in a container, wherein the materials of the solid-state electrochemical cell include a sulfide-based solid-state electrolyte, wherein the complexing agent is selected from the group consisting of $P_4S_8$, $P_4S_9$, $Sb_2S_5$ and mixtures thereof, wherein adding the complexing agent decomposes the sulfide-based solid electrolyte;

(b) providing energy to the solid-state electrochemical cell and the solvent in the container to promote dissolution of first materials of the solid-state electrochemical cell;

(c) separating the solvent and dissolved first materials from remaining materials of the solid-state electrochemical cell;

(d) recovering the dissolved first materials; and
(e) repeating steps (a), (b), (c), and (d) with one or more same or different solvents or mixtures thereof.

* * * * *